US009285963B2

United States Patent
Nara et al.

(10) Patent No.: US 9,285,963 B2
(45) Date of Patent: *Mar. 15, 2016

(54) IN-CAR INFORMATION SYSTEM, INFORMATION TERMINAL, AND APPLICATION EXECUTION METHOD (71) Applicant: Clarion Co., Ltd., Saitama-shi, Saitama (JP)

(72) Inventors: Norikazu Nara, Matsudo (JP); Katsuya Matsuyuki, Saitama (JP); Masafumi Naitou, Saitama (JP); Ryohei Kato, Yokohama (JP)

(73) Assignee: Clarion Co., Ltd., Saitama-shi (JP)

( * ) Notice: Subject to any disclaimer, the term of this patent is extended or adjusted under 35 U.S.C. 154(b) by 251 days.

This patent is subject to a terminal disclaimer.

(21) Appl. No.: 13/860,623

(22) Filed: Apr. 11, 2013

(65) Prior Publication Data

US 2013/0298052 A1    Nov. 7, 2013

(30) Foreign Application Priority Data

Apr. 12, 2012 (JP) ................................. 2012-091103

(51) Int. Cl.
*G06F 3/00* (2006.01)
*G06F 9/44* (2006.01)
*G06F 9/46* (2006.01)
*G06F 13/00* (2006.01)
*G06F 3/0484* (2013.01)
*B60K 37/06* (2006.01)
*G01C 21/36* (2006.01)

(52) U.S. Cl.
CPC .............. *G06F 3/0484* (2013.01); *B60K 37/06* (2013.01); *G01C 21/3629* (2013.01); *B60K 2350/357* (2013.01); *B60K 2350/906* (2013.01); *B60K 2350/962* (2013.01)

(58) Field of Classification Search
None
See application file for complete search history.

(56) References Cited

U.S. PATENT DOCUMENTS

| 7,610,144 | B2 | 10/2009 | Tanaka et al. |
| 2010/0134242 | A1* | 6/2010 | Ohta et al. ..................... 340/5.1 |
| 2011/0128446 | A1 | 6/2011 | Woo |
| 2013/0106750 | A1* | 5/2013 | Kurosawa ..................... 345/173 |
| 2013/0190978 | A1 | 7/2013 | Kato et al. |

FOREIGN PATENT DOCUMENTS

| EP | 2 431 870 A2 | 3/2012 |
| JP | 2003-222523 A | 8/2003 |

(Continued)

OTHER PUBLICATIONS

European Search Report dated Aug. 9, 2013 (Four (4) pages).

(Continued)

*Primary Examiner* — Emerson Puente
*Assistant Examiner* — Kacy Verdi
(74) *Attorney, Agent, or Firm* — Crowell & Moring LLP (57) ABSTRACT An in-car information system includes a portable information terminal and an in-car device. The information terminal identifies a specific application being executed in the foreground and transmits restriction information pertaining to the particular application to the in-car device. The in-car device either allows or disallows, based upon the restriction information transmitted from the information terminal, image display corresponding to the application being executed in the foreground and transmission of operation information corresponding to an input operation.

6 Claims, 7 Drawing Sheets (56) References Cited

FOREIGN PATENT DOCUMENTS

| JP | 2006-285849 | A | | 10/2006 |
|---|---|---|---|---|
| JP | 2009-42873 | | | 2/2009 |
| JP | 2010-130670 | A | | 6/2010 |
| JP | 2010130670 | | * | 6/2010 |

| WO | WO 2011/111306 | A1 | 9/2011 |
|---|---|---|---|
| WO | WO 2012/036279 | A1 | 3/2012 |

OTHER PUBLICATIONS

Corresponding Japanese Office Action dated Jan. 26, 2016 with English-language translation.

* cited by examiner

IN-CAR INFORMATION SYSTEM, INFORMATION TERMINAL, AND APPLICATION EXECUTION METHOD

INCORPORATION BY REFERENCE

The disclosure of the following priority application is herein incorporated by reference: Japanese Patent Application No. 2012-91103 filed Apr. 12, 2012

BACKGROUND OF THE INVENTION

1. Field of the Invention

The present invention relates to an in-car information system, and an information terminal and an application execution method used in the in-car information system.

2. Description of the Related Art

In-car devices in the related art capable of executing various application programs installed therein are widely used today. Such in-car devices known in the related art include a device that pre-assigns a specific ID symbol to each application and activates only applications that will not interfere with safe driving while the vehicle is in a traveling state by either allowing or disallowing operations of the individual applications based upon the ID symbols assigned thereto (see patent literature 1: Japanese Laid Open Patent Publication No. 2003-222523).

The technology disclosed in patent literature 1 is adopted in control of the execution of applications installed in an in-car device. This means that driving safety cannot be assured by adopting this technology when image or sound content is output via the in-car device through execution of an application installed in a portable information terminal, such as a portable telephone or a smart phone, connected to the in-car device.

SUMMARY OF THE INVENTION

The in-car information system according to a first aspect of the present invention includes a portable information terminal and an in-car device, wherein the information terminal includes a storage unit in which a plurality of applications and regulatory information indicating details of operational restrictions to be imposed on each application while a vehicle is in a traveling state are stored, a control unit that executes an application, among the plurality of applications stored in the storage unit, in a foreground, and an image output unit that outputs an image corresponding to the application being executed in the foreground by the control unit to the in-car device. The in-car device includes a display unit that displays the image output from the information terminal, an operation input unit via which an operation performed by a user is input, and an operation information transmission unit that transmits operation information corresponding to the operation input via the operation input unit to the information terminal. In this in-car information system, the information terminal transmits restriction information corresponding to the details of the operational restrictions to be imposed on the application while the vehicle is in a traveling state to the in-car device, by identifying a specific application being executed in the foreground by the control unit and referencing the regulatory information, and the in-car device either allows or disallows display of the image at the display unit and transmission of the operation information via the operation information transmission unit based upon the restriction information transmitted from the information terminal.

The in-car information system according to a second aspect of the present invention includes a portable information terminal and an in-car device, wherein the information terminal includes a storage unit in which a plurality of applications and first regulatory information indicating a group to which each application belongs are stored, a control unit that executes an application, among the plurality of applications stored in the storage unit, in a foreground, and an image output unit that outputs an image corresponding to the application being executed in the foreground by the control unit to the in-car device. The in-car device includes a display unit that displays the image output from the information terminal, an operation input unit via which an operation performed by a user is input, an operation information transmission unit that transmits operation information corresponding to the operation input via the operation input unit to the information terminal, and an in-car storage unit in which second regulatory information pertaining to operational restrictions to be imposed in correspondence to each group while a vehicle is in a traveling state is stored. In this in-car information system, the information terminal transmits group information corresponding to the group to which the application belongs to the in-car device, by identifying a specific application being executed in the foreground by the control unit and referencing the first regulatory information, and the in-car device determines details of the operational restrictions to be imposed in correspondence to the group to which the application belongs while the vehicle is in a traveling state by referencing the second regulatory information based upon the group information transmitted from the information terminal and either allows or disallows display of the image at the display unit and transmission of the operation information via the operation information transmission unit.

According to a third aspect of the present invention, in the in-car information system of the first or second aspect, it is preferred that: the plurality of applications includes an application manager used to establish a connection between the information terminal and the in-car device; and the control unit executes an application other than the application manager in the foreground and executes the application manager in a background.

According to a fourth aspect of the present invention, in the in-car information system of the third aspect, if an application other than the application manager is started up while the application manager is being executed in the foreground, the control unit may move the application manager to the background and execute the application in the foreground.

According to a fifth aspect of the present invention, in the in-car information system of the fourth aspect, it is preferred that: the application manager, currently being executed in the foreground by the control unit, starts up an application other than the application manager selected by the user; and the application manager, currently being executed in the background by the control unit, identifies the application having been started up as an application being executed in the foreground.

According to a sixth aspect of the present invention, in the in-car information system of the third or fourth aspect, the information terminal may include an operating system engaged in control of operations by the control unit, and the application manager may issue a request to the operating system for information to be used to identify the application being executed in the foreground over predetermined cycles.

The information terminal according to a seventh aspect of the present invention, which is a portable information terminal that can be connected with an in-car device, includes: a storage unit in which a plurality of applications and regulatory information indicating details of operational restrictions to be imposed on each application while a vehicle is in a traveling state are stored; a control unit that executes an application, among the plurality of applications stored in the storage unit, in a foreground; and an image output unit that outputs an image corresponding to the application being executed in the foreground by the control unit to the in-car device, and the information terminal transmits restriction information corresponding to the details of the operational restrictions to be imposed on the application while the vehicle is in a traveling state to the in-car device, by identifying a specific application being executed in the foreground by the control unit and referencing the regulatory information.

The information terminal according to an eighth aspect of the present invention, which is a portable information terminal that can be connected with an in-car device, includes: a storage unit in which a plurality of applications and regulatory information indicating a group to which each application belongs are stored; a control unit that executes an application, among the plurality of applications stored in the storage unit, in a foreground; and an image output unit that outputs an image corresponding to the application being executed in the foreground by the control unit to the in-car device, and the information terminal transmits group information corresponding to the group to which the application belongs to the in-car device, by identifying a specific application being executed in the foreground by the control unit and referencing the regulatory information.

The application execution method according to a ninth aspect of the present invention is adopted in an in-car information system including a portable information terminal and an in-car device and includes: storing a plurality of applications and regulatory information indicating details of operational restrictions to be imposed on each application while a vehicle is in a traveling state in advance in the information terminal; transmitting, when an application among the plurality of applications is being executed in a foreground, restriction information corresponding to the details of the operational restrictions to be imposed on the application while the vehicle is in a traveling state to the in-car device, by identifying the application being executed in the foreground and referencing the regulatory information at the information terminal; and either allowing or disallowing, based upon the restriction information transmitted from the information terminal, display of an image output from the information terminal and transmission of operation information, which corresponds to a user operation, to the information terminal, at the in-car device.

The application execution method according to a tenth aspect of the present invention is adopted in an in-car information system including a portable information terminal and an in-car device and includes: storing a plurality of applications and first regulatory information indicating a group to which each application belongs in advance in the information terminal; storing second regulatory information pertaining to operational restrictions to be imposed in correspondence to each group while a vehicle is in a traveling state in advance in the in-car device, transmitting, when an application among the plurality of applications is being executed in a foreground, group information corresponding to the group to which the application belongs to the in-car device, by identifying the application being executed in the foreground and referencing the first regulatory information at the information terminal; and determining details of the operational restrictions to be imposed in correspondence to the group to which the application belongs, while the vehicle is in a traveling state by referencing the second regulatory information based upon the group information transmitted from the information terminal, and either allowing or disallowing display of an image output from the information terminal and transmission of operation information, which corresponds to a user operation, to the information terminal, at the in-car device.

The computer-readable program product according to an eleventh aspect of the present invention includes a program that can be executed at a portable information terminal connected with an in-car device and including a control unit and a memory unit in which a plurality of applications and regulatory information, indicating details of operational restrictions to be imposed on each application while a vehicle is in a traveling state, are stored in advance. In this program product, the program engages: the control unit to read out and execute an application among the plurality of applications stored in the memory unit in a foreground; the control unit to identify a specific application being executed in the foreground and reference the regulatory information; and, based upon referencing results provided by the control unit, the information terminal to transmit restriction information corresponding to the details of operational restrictions to be imposed on the application while the vehicle is in a traveling state to the in-car device.

The computer-readable program product according to a twelfth aspect of the present invention includes a program that can be executed at a portable information terminal connected with an in-car device and including a control unit and a memory unit in which a plurality of applications and regulatory information, indicating a group to which each application belongs, are stored in advance. In this program product, the program engages: the control unit to read out and execute an application among the plurality of applications stored in the memory unit in a foreground; the control unit to identify a specific application being executed in the foreground and reference the regulatory information; and, based upon referencing results provided by the control unit, the information terminal to transmit group information corresponding to the group to which the application belongs to the in-car device.

According to the present invention, driving safety is assured while a vehicle is in a traveling state, even if a portable information terminal is connected to an in-car device and image or sound is output via the in-car device by executing an application installed in the information terminal.

DESCRIPTION OF PREFERRED EMBODIMENTS

—First Embodiment—

Figure 1:
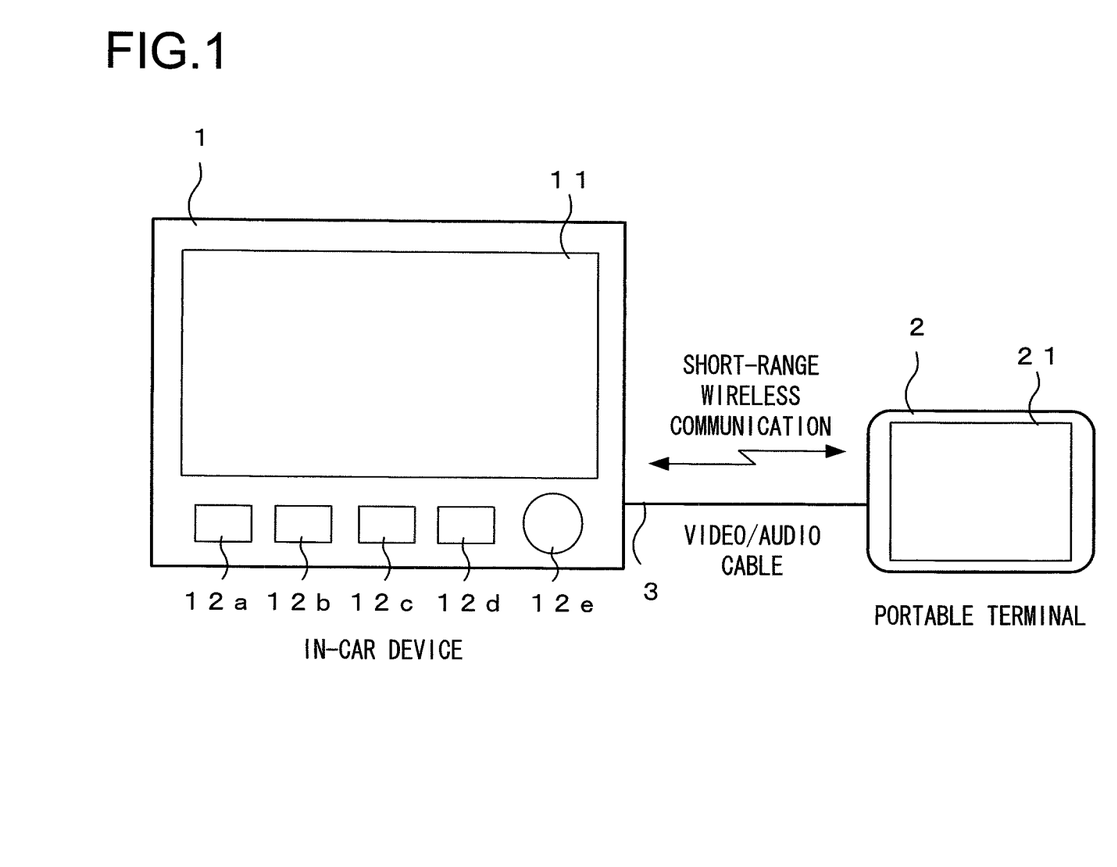
FIG. 1 shows the structure of the in-car information system achieved in an embodiment of the present invention.

FIG. 1 shows the structure of the in-car information system achieved in an embodiment of the present invention. The in-car information system in FIG. 1, which is used as an onboard system installed in a vehicle, is configured by connecting an in-car device 1 with a portable terminal 2 through short-range wireless communication and through wired communication enabled via a video/audio cable 3. The in-car device 1 is installed at a fixed position within the vehicle, at, for instance, the instrument panel in the vehicle. The portable terminal 2 is a portable information terminal that can be carried by the user, such as a portable telephone or a smart phone. It is to be noted that short-range wireless communication may be carried out between the in-car device 1 and the portable terminal 2 in compliance with, for instance, the Bluetooth standard.

A display unit 11 and operation keys (operation switches) 12a, 12b, 12c, 12d and 12e are disposed at the in-car device 1. The display unit 11 is a display monitor at which various types of still images and video can be displayed, and may be constituted with, for instance, a liquid crystal display unit. The operation keys 12a through 12e are operation switches via which user input operations are detected and are assigned with various functions in correspondence to the processing currently underway in the in-car device 1. The user operates a specific operation key among the operation keys 12a through 12e to engage the in-car device 1 in execution of a desired function. It is to be noted that while the example presented in FIG. 1 includes the operation keys 12a through 12d configured as push button-type switches and the operation key 12e configured as a dial-type switch that can be rotated to the left and to the right, the present invention is not limited to this example and may be adopted in conjunction with operation keys disposed with a different positional arrangement, operation keys adopting different structures, operation keys provided in a different quantity or the like. In addition, the display unit 11 may be configured as a touch panel-type display monitor. Such a display unit 11 may include only some of the operation keys or it may dispense with all the operation keys.

A display unit 21 is disposed at the portable terminal 2. The display unit 21 is a touch panel-type display monitor at which various types of still images and video can be displayed. It may be configured by combining, for instance, a touch sensor capable of detecting a position at which it has been touched and a liquid crystal display unit. The user is able to issue an instruction for the portable terminal 2 to execute a desired function by touching a given position on the display unit 21 with his finger or the like, in correspondence to the content of a still image or video on display at the display unit 21. It is to be noted that while the display unit 21 in this embodiment is constituted with a touch panel-type display monitor, the present invention may be adopted in conjunction with a standard display monitor instead of a touch panel-type display monitor. In such a case, it is desirable that the portable terminal 2 include various types of operation switches corresponding to specific details of processing executed by the portable terminal 2. As an alternative, the present invention may be adopted in conjunction with a display unit 21 constituted with a touch panel-type display monitor in an portable terminal 2 that also includes operation switches, each corresponding to a specific operation.

Figure 2:
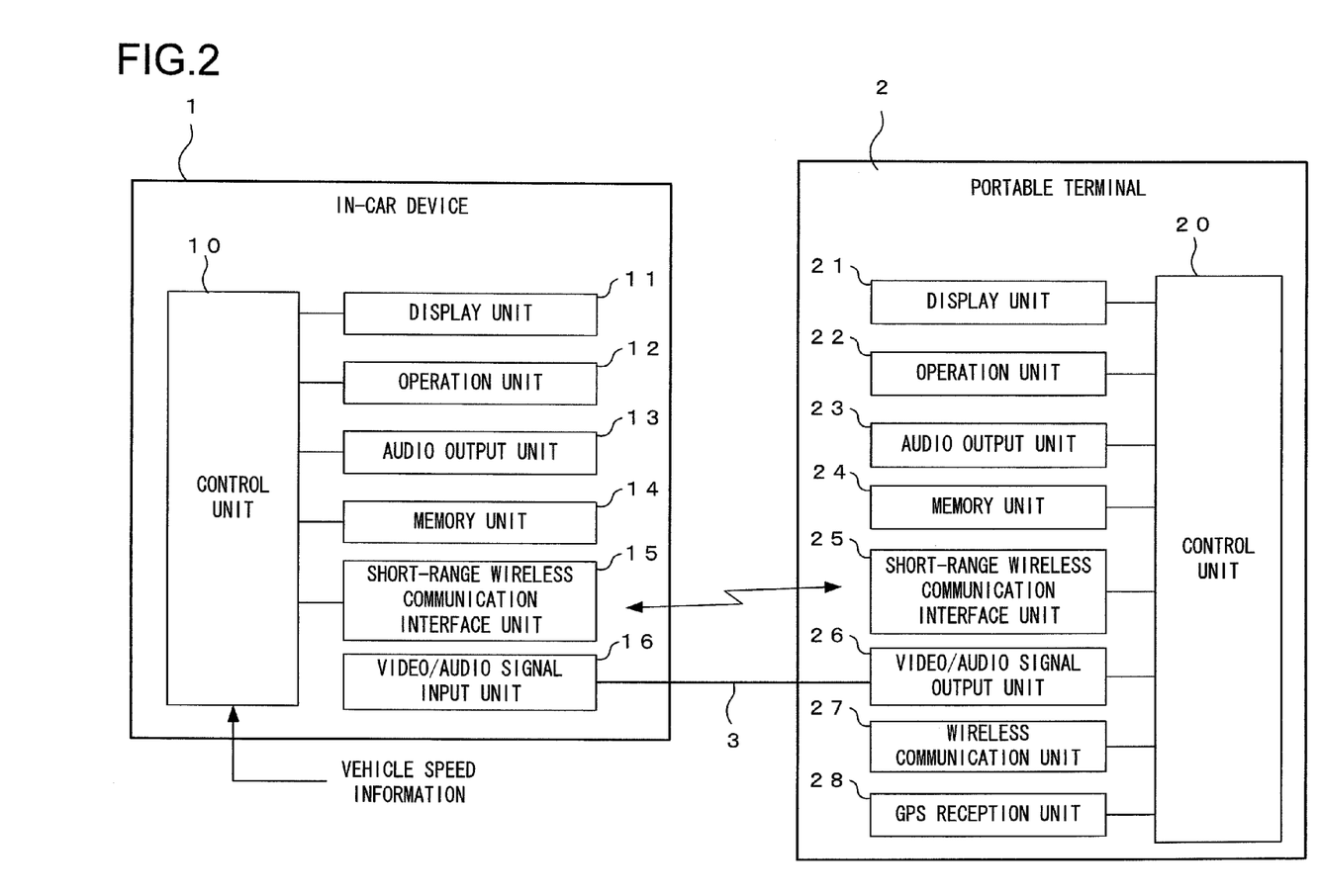
FIG. 2 is a block diagram showing the structures adopted in the in-car device and the portable terminal.

FIG. 2 is a block diagram showing the structures of the in-car device 1 and the portable terminal 2. As shown in FIG. 2, the in-car device 1 includes a control unit 10, the display unit 11, an operation unit 12, an audio output unit 13, a memory unit 14, a short-range wireless communication interface unit 15 and a video/audio signal input unit 16. The portable terminal 2 includes a control unit 20, the display unit 21, an operation unit 22, an audio output unit 23, a memory unit 24, a short-range wireless communication interface unit 25, a video/audio signal output unit 26, a wireless communication unit 27 and a GPS (global positioning system) reception unit 28.

The control unit 10 in the in-car device 1, which is constituted with a microprocessor, various peripheral circuits, a RAM, a ROM and the like, executes various types of processing based upon a control program recorded in the memory unit 14. Various types of image display processing, audio output processing and the like are enabled through processing executed by the control unit 10.

In addition, the control unit 10 obtains vehicle speed information output from the vehicle. A decision as to whether or not the vehicle is currently in a traveling state is made in the control unit 10 based upon the vehicle speed information. It is to be noted that the vehicle information may be provided from the vehicle to the control unit 10 in the form of a vehicle speed pulse output via a CAN (controller area network) configuring an onboard communication network, from a vehicle speed sensor installed in the vehicle.

As has been explained in reference to FIG. 1, the display unit 11 is a display monitor constituted with a liquid crystal display unit or the like. The operation unit 12 is a switch via which a user input operation is detected and it may be configured with, for instance, the operation keys 12a through 12e shown in FIG. 1. It is to be noted that the display unit 11 may instead be configured as a touch panel-type display monitor, as explained earlier, and in such a case, the display unit 11 and the operation unit 12 may be integrated into a single structural element. The details of an input operation performed by the user at the operation unit 12 are output to the control unit 10 and are reflected in the processing executed by the control unit 10.

The audio output unit 13, which includes an amplifier, a speaker and the like, is capable of outputting various types of sound under control executed by the control unit 10. For instance, music played back by reproducing music data read out from the portable terminal 2 or a recording medium (not shown), audio guidance used to guide the vehicle to a destination, or the like can be output from the audio output unit 13.

The memory unit 14, which is a non-volatile data storage device, may be constituted with an HDD (hard disk drive), a flash memory or the like. Various types of data, including the control program used by the control unit 10, as explained earlier, are stored in the memory unit 14. Data are read out from the memory unit 14 and written into the memory unit 14 as needed under control executed by the control unit 10.

The short-range wireless communication interface unit 15 executes, under control executed by the control unit 10, wireless interface processing required to enable short-range wireless communication with the portable terminal 2. For instance, it converts information output from the control unit 10 to a wireless signal in a predetermined signal format and transmits the wireless signal to the portable terminal 2. It also receives information output from the portable terminal 2 as a wireless signal in a predetermined signal format and outputs the received information to the control unit 10. The short-range wireless communication interface unit 15 executes such interface processing in compliance with a specific communication standard such as Bluetooth.

The video/audio signal input unit 16 converts a video signal and an audio signal input from the portable terminal 2 via the video/audio cable 3 to video data for screen display and audio data for audio output respectively and outputs the video data and the audio data to the control unit 10. The control unit 10, having obtained the video data and the audio data output from the video/audio signal input unit 16, controls the display unit 11 so as to bring up on display at the display unit 11 a screen based upon the video data and also enables the audio output unit 13 to output sound based upon the audio data by controlling the audio output unit 13.

The control unit 20 in the portable terminal 2 is constituted with a microprocessor, various peripheral circuits, a RAM, a ROM and the like, as is the control unit 10 in the in-car device 1, and executes various types of processing based upon a control program recorded in the memory unit 24.

As explained earlier, the display unit 21 is a touch panel-type display monitor. The operation unit 22 is used for purposes of user input operation detection. It is to be noted that while the display unit 21 and the operation unit 22 are shown as separate structural elements in FIG. 2, the operation unit 22 is, in fact, configured as an integrated part of the touch panel-type display unit 21. In the alternative configuration described earlier, which includes operation switches disposed at the portable terminal 2, the operation switches correspond to the operation unit 22. The details of a user input operation performed at the operation unit 22 are output to the control unit 20 and are reflected in the processing executed by the control unit 20.

The audio output unit 23, which includes an amplifier, a speaker and the like, is capable of outputting various types of sound under control executed by the control unit 20. During a phone conversation carried out via the portable terminal 2, for instance, the voice of the other party is output from the audio output unit 23.

In the memory unit 24, which is a non-volatile data storage device similar to the memory unit 14 in the in-car device 1, various types of data to be used in the processing executed by the control unit 20 are stored. Various application programs (hereafter simply referred to as applications) acquired by the user in advance are also stored in the memory unit 24. The user is able to select a specific application among the various applications stored in the memory unit 24 and have it executed by the control unit 20. In this manner, various functions can be fulfilled in the portable terminal 2.

As does the short-range wireless communication interface unit 15 in the in-car device 1, the short-range wireless communication interface unit 25 executes wireless interface processing in compliance with the predetermined communication standard. Namely, information communication between the in-car device 1 and the portable terminal 2 is achieved as the short-range wireless communication interface unit 15 and the short-range wireless communication interface unit 25 exchange information with each other through wireless communication.

The video/audio signal output unit 26 converts a screen display and sound generated by the control unit 20 to a video signal and an audio signal in a predetermined signal format and outputs the video signal and the audio signal resulting from the conversion to the in-car device 1 via the video/audio cable 3. As the video signal and the audio signal are input to the video/audio signal input unit 16 in the in-car device 1, a screen display identical to that brought up on display at the display unit 21 in the portable terminal 2 is brought up on display at the display unit 11 in the in-car device 1 and sound identical to that output from the audio output unit 23 in the portable terminal 2 is also output from the audio output unit 13 in the in-car device 1. The term "video mirroring" is often used to refer to this function.

The portable terminal 2 performs wireless communication to connect with another portable terminal or a server via a wireless communication network (not shown). Through the wireless communication carried out via the wireless communication unit 27, the portable terminal 2 is able to perform a telephone conversation with another portable terminal, download applications from a server, and the like. It is to be noted that the wireless communication network enabling the wireless communication carried out via the wireless communication unit 27 may be, for instance, a portable telephone network or the Internet, connection with which can be established via a wireless LAN.

The GPS reception unit 28 receives GPS signals transmitted from GPS satellites and outputs the GPS signals thus received to the control unit 20. Each GPS signal carries, as information that can be used to determine the current position of the portable terminal 2 and the current time, information indicating the position of the GPS satellite having transmitted the particular GPS signal and the transmission time point. Thus, the current position and the current time can be calculated in the control unit 20 based upon information carried in GPS signals received from a predetermined minimum number of GPS satellites.

Next, a coordinated function achieved by the in-car device 1 and the portable terminal 2 in this in-car information system will be described. A coordinated function achieved by the in-car device 1 and the portable terminal 2 is available in the in-car information system. When the coordinated function is in effect, an image and sound corresponding to a specific application, among the various applications, executed at the portable terminal 2 connected with the in-car device 1 can also be displayed and output at the in-car device 1. In addition, the details of a user operation performed at the in-car device 1 can be reflected in the operation of the application being executed at the portable terminal 2.

For instance, navigation processing may be executed so as to guide the vehicle to a destination by executing a navigation application at the portable terminal 2. In the navigation processing, a map screen with a map of an area around the current position drawn therein is created at the portable terminal 2 and a video signal corresponding to the map screen is output to the video/audio signal input unit 16 from the video/audio signal output unit 26 via the video/audio cable 3. Through this processing, the map screen is transmitted from the portable terminal 2 to the in-car device 1 so as to bring up the map screen of the area around the current position at the display unit 11 in the in-car device 1. In addition, as the user sets a destination through a user operation performed at the operation unit 12 in the in-car device 1 or at the operation unit 22 in the portable terminal 2, a search for a recommended route from the current vehicle position designated as a departure point to the destination having been set is executed at the portable terminal 2. As the vehicle approaches a guidance requiring point on the recommended route, audio guidance data indicating the direction along which the vehicle is to advance at the particular guidance requiring point are transmitted from the portable terminal 2 to the in-car device 1. As a result, audio guidance can be output from the audio output unit 13 in the in-car device 1. It is to be noted that specific signals may be output from the portable terminal 2 to the in-car device 1, each in correspondence to the timing of the audio guidance data output start and the timing of the audio guidance data output end. Through these measures, it can be ensured that the user will be able to hear the audio guidance clearly, even if other audio data are being output via the radio, the CD player or the like in the in-car device 1, by lowering the sound volume during audio guidance output. As described above, the in-car device 1 provides the user with guidance information so that the user is able to drive the vehicle to the destination without getting lost by displaying the map image at the display unit 11 and outputting audio guidance via the audio output unit 13.

It is to be noted that various types of data, including map data needed by the portable terminal 2 when executing the navigation application, may be stored in advance in the memory unit 24 in the portable terminal 2. As an alternative, only the minimum volume of data that is absolutely necessary may be stored in the memory unit 24 and in such a case, the portable terminal 2 should be able to connect with a specific server via the wireless communication unit 27 in order to obtain necessary data each time it executes the navigation application.

At the portable terminal 2, an application selected by the user, among a plurality of applications including a navigation application such as that described above, is executed. The user is able to select a desired application he wishes to have executed at the portable terminal 2 in a menu screen on display at the display unit 21 in the portable terminal 2 by operating the operation unit 22.

In addition, the portable terminal 2 transmits the menu screen, expressed with a video signal provided from the video/audio signal output unit 26, to the in-car device 1. Based upon the video signal transmitted from the portable terminal 2, the in-car device 1 brings up the menu screen on display at the display unit 11. As the user operates the operation unit 12 so as to select a desired application in this menu screen, operation information corresponding to the operational details of the user operation is transmitted via the short-range wireless communication interface unit 15 from the in-car device 1 to the portable terminal 2. This operation information is received at the short-range wireless communication interface unit 25 in the portable terminal 2 and is then output to the control unit 20. Based upon the operation information received as described above, the control unit 20 identifies the application selected by the user at the in-car device 1 and executes the selected application. Through this process, the user is able to select a desired application at the in-car device 1, just as he is able to select a desired application in the menu screen brought up on display at the display unit 21 in the portable terminal 2, and have the selected application executed in the portable terminal 2.

In order to enable a coordinated function such as that described above achieved by connecting the in-car device 1 and the portable terminal 2 to each other, an application referred to as an application manager is installed in advance and stored in the memory unit 24 at the portable terminal 2. This application manager is executed in the foreground unless execution of another application is underway in the control unit 20. In this situation, for instance, the application manager identifies a specific application having been selected by the user via the in-car device 1 based upon operation information transmitted from the in-car device 1 and reads out the identified application from the memory unit 24 to be executed by the control unit 20. If, on the other hand, execution of another application is underway in the control unit 20, the application manager is executed in the background. In this situation, for instance, the application manager determines the details of a user operation having been performed at the in-car device 1 based upon operation information transmitted from the in-car device 1 and engages the application, the execution of which is currently underway in the foreground, in processing corresponding to the operational details. It is to be noted that the operation information output from the in-car device 1 to the portable terminal 2 may be, for instance, button information indicating details of a button operation performed by the user or coordinate information indicating a position on the screen at the display unit 11 specified through a touch panel operation.

Next, operational restrictions that may be imposed on applications while the vehicle is in a traveling state will be described. The applications that can be executed at the portable terminal 2 include applications that might distract the driver and thus compromise driving safety if image display or user operation input at the in-car device 1, enabled through a coordinated function such as that described earlier, was allowed while the vehicle was in a traveling state. Accordingly, it is desirable that even if such an application is executed at the portable terminal 2 while the vehicle is traveling, restrictions be imposed on image display or user operation input at the in-car device 1 corresponding to the application. To achieve such measures, operational restrictions are imposed for applications by the in-car device 1 and the portable terminal 2 while the vehicle is in a traveling state, through the method described below.

Figure 3:
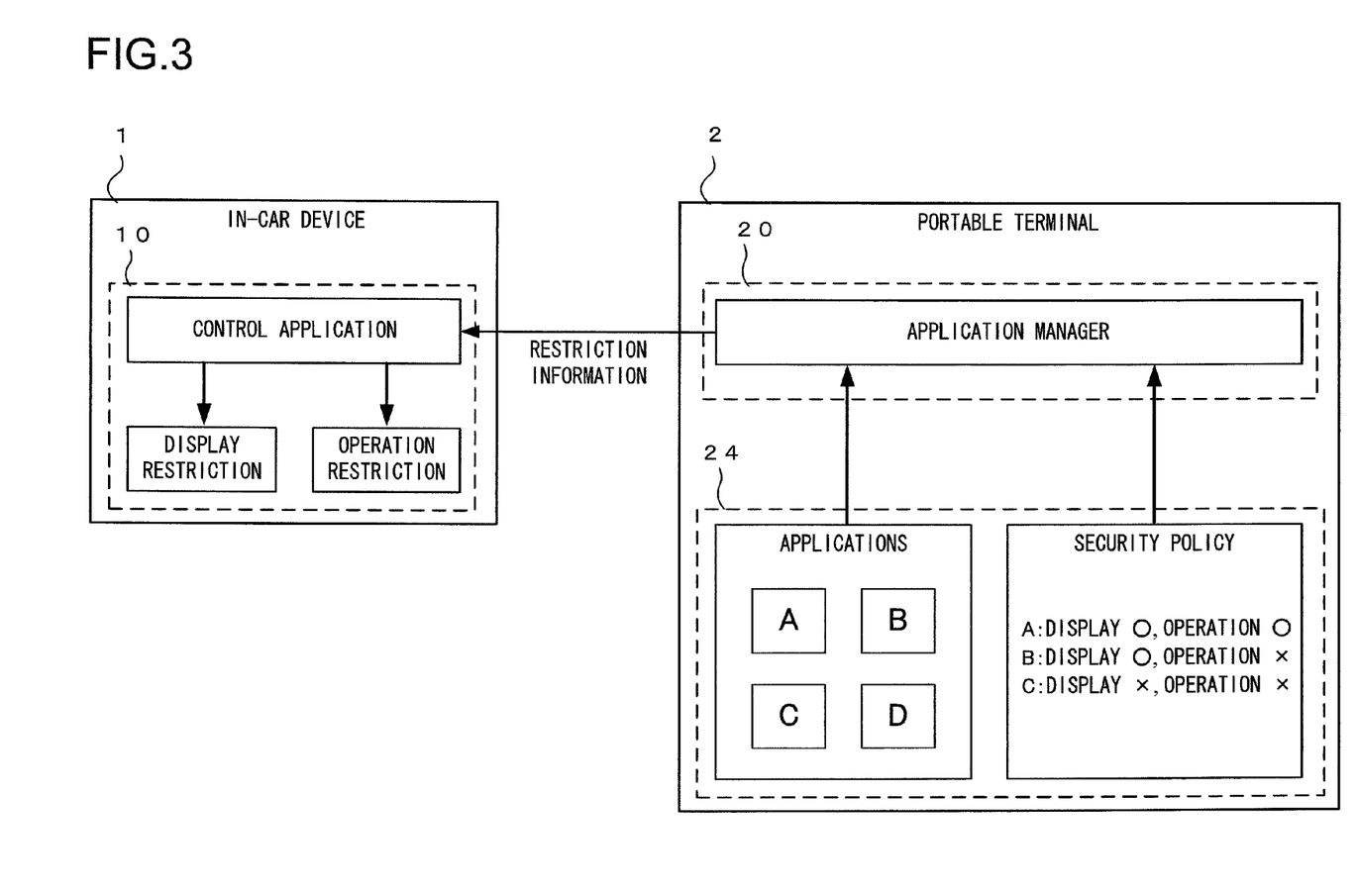
FIG. 3 is a conceptual diagram of a first embodiment of the present invention illustrating how operational restrictions may be imposed for applications while the vehicle is in a traveling state.

FIG. 3 is a conceptual diagram illustrating how operational restrictions are imposed for applications while the vehicle is traveling in the first embodiment of the present invention. The following description of restrictions imposed on application operations while the vehicle is traveling will be given by assuming that four different types of preinstalled applications A, B, C and D, are stored in the memory unit 24 at the portable terminal 2, as illustrated in FIG. 3, and that one of these applications is selected and executed in response to a user operation.

In addition to the applications A through D, regulatory information indicating details of operational restrictions to be applied in correspondence to the individual applications while the vehicle is in a traveling state is stored as a security policy in the memory unit 24. The security policy in the example presented in FIG. 3 allows both image display and user operation input in correspondence to application A, allows image display but disallows user operation input in correspondence to application B and disallows both image display and user operation input in correspondence to application C. It is to be noted that no regulatory information is recorded in the security policy for application D in the example presented in FIG. 3.

As a specific application among the applications A through D is selected in response to a user operation at the portable terminal 2, the particular application is read out from the memory unit 24 and is started up by the application manager being executed in the control unit 20. Subsequently, the execution of the application starts in the foreground and the application manager, having been executed in the foreground, moves to the background.

Once execution of an application among applications A through D by the control unit 20 starts, as described above, the application manager identifies the application being executed in the foreground. Then, it references the security policy stored in the memory unit 24 makes a decision with regard to the details of operational restrictions to be imposed on the particular application while the vehicle is traveling.

For instance, if application A is currently being executed, the application manager makes a decision with regard to the details of the operational restrictions to be imposed on application A while the vehicle is in a traveling state by referencing the part of the security policy corresponding to application A. Namely, it decides that both image display and user operation input are allowed in correspondence to application A even while the vehicle is in a traveling state.

If, on the other hand, application B is currently being executed, the application manager makes a decision with regard to the details of the operational restrictions to be imposed on application B while the vehicle is in a traveling state by referencing the part of the security policy corresponding to application B. Namely, it decides that image display is allowed but user operation input is disallowed in correspondence to application B while the vehicle is in a traveling state.

In addition, if application C is currently being executed, the application manager makes a decision with regard to the details of the operational restrictions to be imposed on application C while the vehicle is in a traveling state by referencing the part of the security policy corresponding to application C. Namely, it decides that both image display and user operation input are disallowed in correspondence to application C while the vehicle is in a traveling state.

It is to be noted that if application D is currently being executed in the control unit 20, no regulatory information can be referenced since the security policy does not include any part corresponding to application D. Under such circumstances, it is desirable to decide that both image display and user operation input are to be disallowed, as in the case of application C. Through these measures, even when an application not covered by the security policy is being executed, driver distraction will be prevented and safe driving will be assured.

Upon making a decision with regard to the details of the operational restrictions to be imposed while the vehicle is in a traveling state on the application currently being executed, as described above, the application manager transmits restriction information indicating the decision-making results to the in-car device 1. The restriction information is transmitted via the short-range wireless communication interface unit 25.

At the in-car device 1, a control application being executed in the control unit 10 receives, via the short-range wireless communication interface unit 15, the restriction information having been transmitted from the portable terminal 2. Then, based upon the restriction information having been received, the details of the operational restrictions to be imposed while the vehicle is in a traveling state for the application being executed at the portable terminal 2 are determined and if the vehicle is currently in a traveling state, a display restriction or an operation restriction is imposed in correspondence to the details of the operational restrictions.

For instance, if application A is currently being executed at the portable terminal 2, display of an image originating from the portable terminal 2 and user operation input are both allowed even while the vehicle is in a traveling state, without imposing any display or operation restriction. Namely, the image corresponding to the application A originating from the portable terminal 2 is output to the display unit 11 and is thus brought up on display at the display unit 11, and the operation information corresponding to the operation input performed at the operation unit 12 is transmitted from the short-range wireless communication interface unit 15.

If, on the other hand, application B is currently being executed at the portable terminal 2, display of an image originating from the portable terminal 2 is allowed but user operation input is disallowed while the vehicle is in a traveling state by simply imposing the operation restriction alone. Namely, the image corresponding to the application B originating from the portable terminal 2 is output to the display unit 11 and is thus brought up on display at the display unit 11, but transmission of the operation information via the short-range wireless communication interface unit 15 is disallowed.

In addition, if application C or application D is currently being executed at the portable terminal 2, display of an image originating from the portable terminal 2 and user operation input are both disallowed while the vehicle is in a traveling state by imposing both the display restriction and the operation restriction. Namely, image display at the display unit 11 is disallowed and also transmission of the operation information via the short-range wireless communication interface unit 15 is disallowed.

Figure 4:
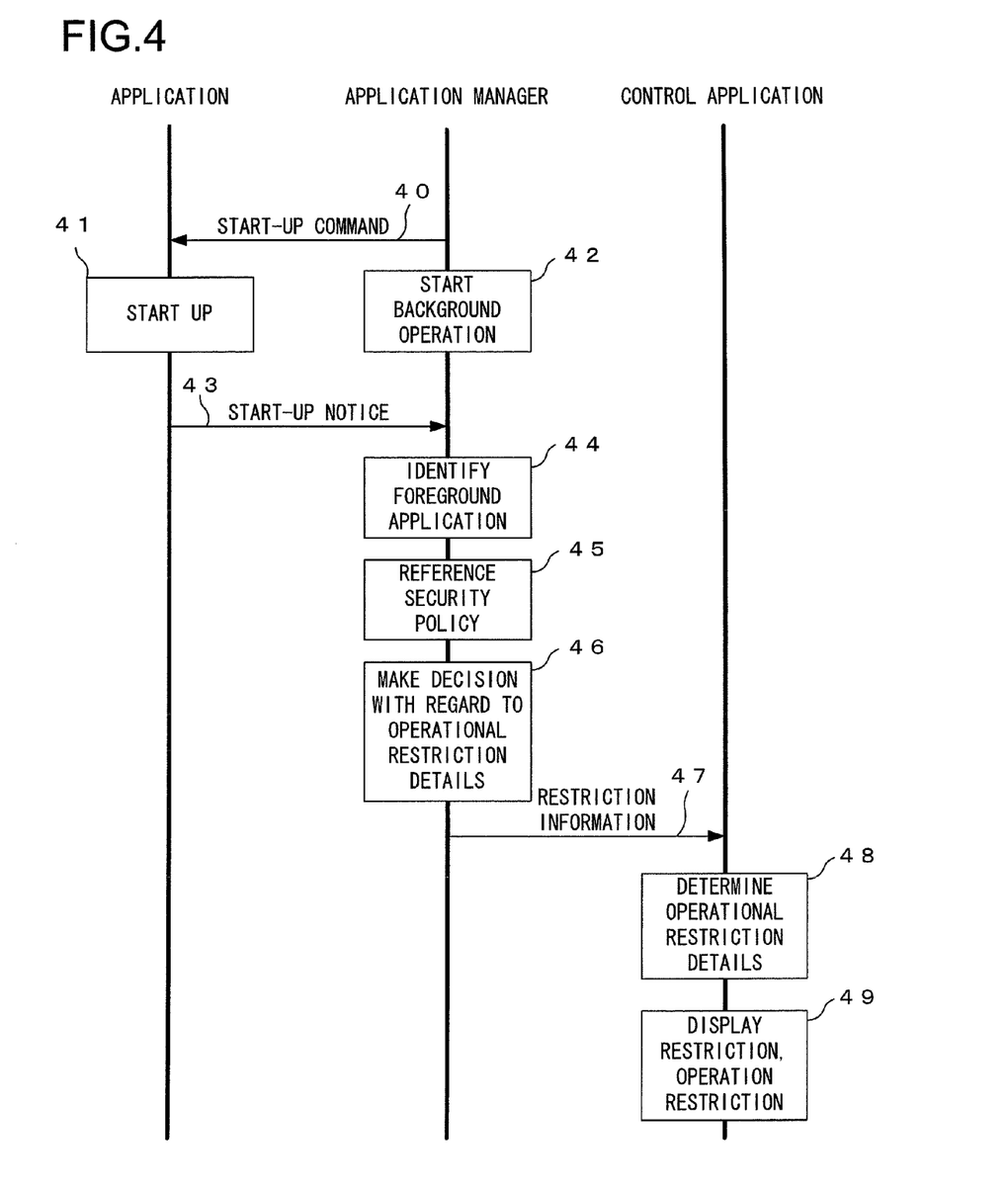
FIG. 4 presents a flowchart of the processing executed at the in-car device and at the portable terminal in order to impose operational restrictions on a given application while the vehicle is in a traveling state in the first embodiment of the present invention.

FIG. 4 presents a flowchart of the processing executed at the in-car device 1 and at the portable terminal 2 in the first embodiment of the present invention as described above in order to impose operational restrictions on a given application while the vehicle is in a traveling state.

As the user selects an application at the portable terminal 2, the application manager outputs a start-up command in step 40 to start up the application. In response to the start-up command, the application is started up in step 41 and its execution by the control unit 20 starts in the foreground. At this time, in order to allow the application having been started up to be executed in the foreground, the application manager moves to the background and its operation starts in the background in step 42.

After the application is started up in step 41 as described above, the application outputs a start-up notice to the application manager in step 43. The application manager, having received the start-up notice, then makes a decision with regard to the application being executed in the foreground in step 44. In this step, the application manager is able to identify the application having been started up in step 41 based upon the content of the start-up notice received in step 43 and determine the application thus identified as the application being executed in the foreground. As an alternative, it may issue a request to an operating system controlling the operations of the control unit 20 for information that will enable identification of the application being executed in the foreground and then make a decision in step 44 based upon the response provided by the operating system. It is to be noted that in the latter case, the application manager issues a request to the operating system for the information described above each time the processing in step 44 is executed over a predetermined processing cycle, as will be explained later.

Once the decision as to the specific application being executed in the foreground is made through the method described above, the application manager references the security policy corresponding to the identified application in the following step 45. Then, in step 46, it makes a decision with regard to the details of the operational restrictions to be imposed on the application while the vehicle is in a traveling state based upon the content of the security policy having been referenced.

Once the decision with regard to the details of the operational restrictions to be imposed on the application being executed in the foreground while the vehicle is in a traveling state, is made through the decision-making processing in step 46, the application manager transmits restriction information corresponding to these decision-making results to the in-car device 1 in step 47. This restriction information is received by the control application being executed in the control unit 10 at the in-car device 1.

In step 48, the control application determines, based upon the restriction information received in step 47, the details of the operational restrictions to be imposed on the application, the execution of which is underway at the portable terminal 2, while the vehicle is in a traveling state. Then, if the vehicle is in a traveling state, the display restriction and/or the operation restriction is imposed in the following step 49 in correspondence to the details of the operational restrictions having been determined in step 48. It is to be noted that the processing in step 49 does not need to be executed if the vehicle is not in a traveling state.

It is to be noted that the processing in steps 44 through 49 in the flowchart presented in FIG. 4, in reference to which an explanation has been provided above, is repeatedly executed over predetermined processing cycles, as long as any application is being executed at the portable terminal 2. As a result, operational restrictions are imposed on the application being executed at the portable terminal 2, as long as the vehicle remains in a traveling state.

The following advantages (1) through (4) are achieved through the first embodiment of the present invention described above.

(1) The portable terminal 2 in the in-car information system holds a plurality of applications and a security policy recorded therein having regulatory information indicating the details of operational restrictions to be imposed in correspondence to the individual applications while the vehicle is in a traveling state, both stored in the memory unit 24. Any application among the plurality of applications stored in the memory unit 24 may be executed in the foreground in the control unit 20 and an image corresponding to the particular application is output to the in-car device 1 via the video/audio signal output unit 26. The in-car device 1 accepts a user operation input via the operation unit 12 and transmits operation information corresponding to the user operation to the portable terminal 2 via the short-range wireless communication interface unit 15. If the vehicle is in a traveling state, application operational restrictions are imposed in the in-car information system at this time. In more specific terms, the portable terminal 2 determines the specific application being executed in the foreground by the control unit 20 (step 44) and references the security policy stored in the memory unit 24 (step 45), in order to transmit the restriction information corresponding to the details of the operational restrictions to be imposed on the particular application while the vehicle is traveling to the in-car device 1 (step 47). The in-car device 1, in turn, allows or disallows image display at the display unit 11 and the transmission of the operation information via the short-range wireless communication interface unit 15 based upon the restriction information having been transmitted from the portable terminal 2 (steps 48 and 49). Through these measures, driving safety is assured while the vehicle is in a traveling state, even if the portable terminal 2 is connected to the in-car device 1 and an application installed in the portable terminal 2 is executed at the portable terminal 2, so as to output the corresponding image or sound to the in-car device 1.

(2) The plurality of applications stored in the memory unit 24 at the portable terminal 2 includes an application manager used to establish a connection between the portable terminal 2 and the in-car device 1. The control unit 20 executes an application other than the application manager in the foreground and, at the same time, executes the application manager in the background. As a result, the portable terminal 2 and the in-car device 1 can be connected through the application manager executed concurrently with a desired application in the control unit 20, thereby achieving, through the application, a coordinated function.

(3) If an application other than the application manager is started up while the application manager is being executed in the foreground, the control unit 20 moves the application manager to the background (step 42) and executes the application having been started up in the foreground. Through these measures, it is ensured that even if another application is started up while the application manager is being executed in the foreground, the coordinated function can operate in relation to the particular application.

(4) The application manager currently being executed in the foreground by the control unit 20 starts up (step 40) an application other than the application manager itself, having been selected by the user. Then, when the application manager, being executed in the background by the control unit 20, determines in step 44 the application being executed in the foreground, it is able to identify the application having been started up in step 40 as the application being currently executed in the foreground. As an alternative, it may issue a request to the operating system for information that enables identification of the application being executed in the foreground, over predetermined cycles. Through these measures, the application being executed in the foreground can be identified with a high degree of reliability.

—Second Embodiment—

The second embodiment of the present invention will be described next. In the second embodiment, application operational restrictions are imposed while the vehicle is in a traveling state by adopting a method different from that adopted in the first embodiment described earlier. It is to be noted that the following description is given by assuming that the in-car information system achieved in the embodiment assumes a configuration identical to that of the in-car information system in the first embodiment described in reference to FIG. 1, with the in-car device 1 and the portable terminal 2 connected with each other through short-range wireless communication and through wired communication achieved via the video/audio cable 3. In addition, the in-car device 1 and the portable terminal 2 respectively adopt structures identical to those in the first embodiment described in reference to FIG. 2.

Figure 5:
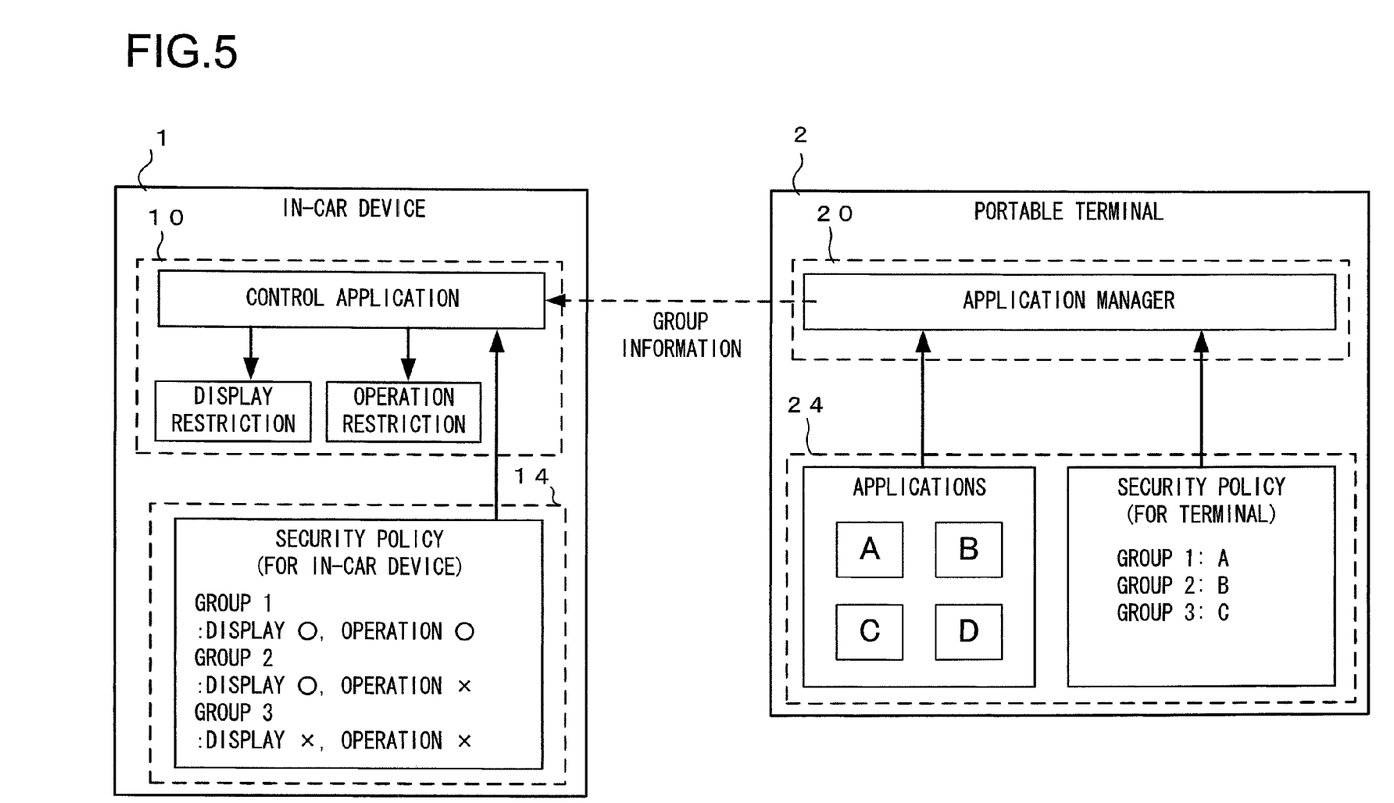
FIG. 5 is a conceptual diagram of a second embodiment of the present invention illustrating how operational restrictions may be imposed for applications while the vehicle is in a traveling state.

FIG. 5 is a conceptual diagram illustrating how operational restrictions are imposed for applications while the vehicle is in a traveling state in the second embodiment of the present invention.

In this embodiment, regulatory information indicating a specific group to which each of applications A through D belongs, instead of the regulatory information described in reference to the first embodiment, is stored as a terminal security policy in the memory unit 24 at the portable terminal 2. The terminal security policy in the example presented in FIG. 5 indicates that application A belongs to group 1, that application B belongs to group 2 and that application C belongs to group 3. It is to be noted that no regulatory information for application D is recorded in the terminal security policy in the example presented in FIG. 5.

In the memory unit 14 in the in-car device 1, regulatory information indicating the details of operational restrictions to be imposed in correspondence to each of the groups listed above while the vehicle is in a traveling state, is stored as an in-car device security policy. The in-car device security policy in the example presented in FIG. 5 indicates that both image display and user operation input are allowed for applications in group 1, that image display is allowed but user operation input is disallowed for applications in group 2 and that both image display and user operation input are disallowed for applications in group 3.

When any application among applications A through D is being executed by the control unit 20, the application manager identifies the specific application being executed in the foreground, as in the first embodiment. It then references the terminal security policy stored in the memory unit 24 in order to make a decision as to which group the particular application belongs to.

For instance, if application A is being executed in the foreground, the application manager references the part of the terminal security policy corresponding to application A and accordingly, decides that application A belongs to group 1.

If, on the other hand, application B is being executed in the foreground, the application manager references the part of the terminal security policy corresponding to application B and accordingly, decides that application B belongs to group 2.

If application C is being executed in the foreground, the application manager references the part of the terminal security policy corresponding to application C and accordingly, decides that application C belongs to group 3.

It is to be noted that when the application being executed by the control unit 20 is application D, no regulatory information can be referenced because the terminal security policy does not include any part corresponding to application D. Under such circumstances, the application manager decides that the group to which application D belongs is unknown.

Upon making a decision with regard to the group to which the application currently being executed belongs, as described above, the application manager transmits group information indicating the decision-making results to the in-car device 1. The restriction information is transmitted via the short-range wireless communication interface unit 25.

At the in-car device 1, a control application being executed by the control unit 10 receives, via the short-range wireless communication interface unit 15, the group information transmitted from the portable terminal 2. Then, based upon the group information thus received, the exact group to which the application being executed at the portable terminal 2 belongs is identified.

Once the group to which the application being executed at the portable terminal 2 belongs is determined, as described above, the control application references the in-car device security policy stored in the memory unit 14 so as to ascertain the details of the operational restrictions to be imposed in correspondence to the particular group while the vehicle is in a traveling state. Then, if the vehicle is in a traveling state, it imposes a display restriction or an operation restriction in correspondence to the operational restriction details.

For instance, if application A belonging to group 1 is currently being executed at the portable terminal 2, the part of the in-car device security policy corresponding to group 1 is referenced so as to ascertain the details of the operational restrictions to be imposed in correspondence to group 1 while the vehicle is traveling. Namely, the control application determines that both the image display and the user operation input are allowed in correspondence to group 1 while the vehicle is in a traveling state. Based upon the determination results, it allows both display of an image originating from the portable terminal 2 and user operation input without imposing any display restriction or operation restriction, even while the vehicle is in a traveling state. In other words, the control application allows the image corresponding to application A, originating from the portable terminal 2, to be output to the display unit 11 and brought up on display at the display unit 11. It also allows operation information corresponding to a user operation input at the operation unit 12 to be transmitted via the short-range wireless communication interface unit 15.

If, on the other hand, application B belonging to group 2 is currently being executed at the portable terminal 2, the part of the in-car device security policy corresponding to group 2 is referenced so as to ascertain the details of the operational restrictions to be imposed in correspondence to group 2 while the vehicle is traveling. Namely, the control application determines that image display alone is allowed and user operation input is disallowed in correspondence to group 2 while the vehicle is in a traveling state. Based upon the determination results, the control application imposes the operation restriction alone while the vehicle is traveling so as to allow display of an image originating from the portable terminal 2 and disallow user operation input. In other words, the control application allows the image corresponding to application B, originating from the portable terminal 2, to be output to the display unit 11 and brought up on display at the display unit 11, but disallows transmission of any operation information via the short-range wireless communication interface unit 15.

In addition, if application C belonging to group 3 is currently being executed at the portable terminal 2, the part of the in-car device security policy corresponding to group 3 is referenced so as to ascertain the details of the operational restrictions to be imposed in correspondence to group 3 while the vehicle is traveling. Namely, the control application determines that both image display and user operation input are disallowed in correspondence to group 3 while the vehicle is in a traveling state. Based upon the determination results, the control application imposes both the display restriction and the operation restriction while the vehicle is traveling so as to disallow both the display of an image originating from the portable terminal 2 and user operation input. In other words, the control application disallows image display at the display unit 11 and also disallows transmission of any operation information via the short-range wireless communication interface unit 15.

It is to be noted that if application D, which does not belong to any of the groups mentioned above, is being executed by the control unit 20, it is decided that the group to which application D belongs is unknown, as explained earlier, and group information indicating these decision-making results is transmitted from the portable terminal 2. Under these circumstances, it is desirable to disallow both image display and user operation input just as image display and user operation input are both disallowed when application C, belonging to group 3, is being executed. Through these measures, even when an application not covered by the security policy is being executed, driver distraction will be prevented and safe driving will be assured.

Figure 6:
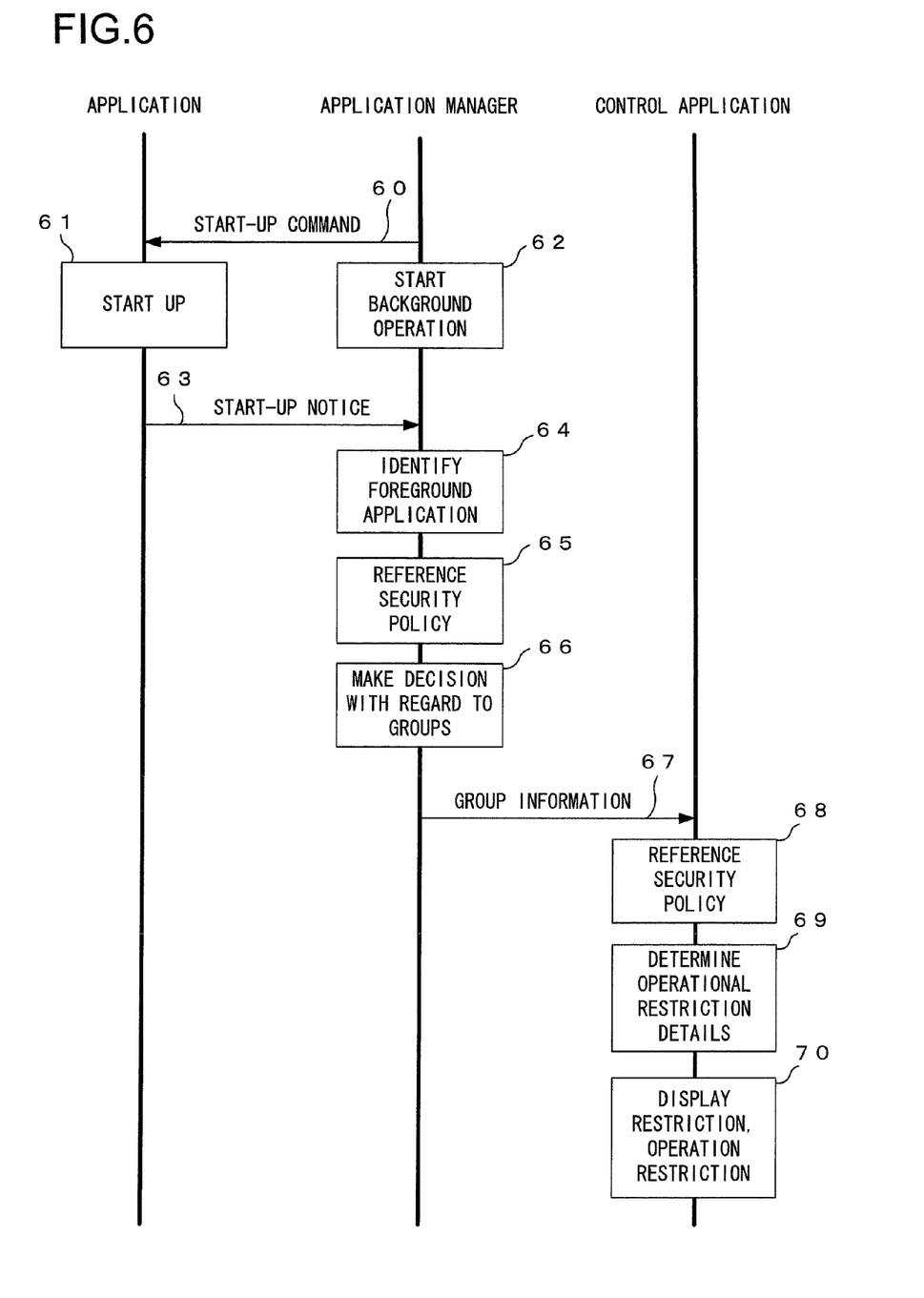
FIG. 6 presents a flowchart of the processing executed at the in-car device and the portable terminal in order to impose operational restrictions on a given application while the vehicle is in a traveling state in the second embodiment of the present invention.

FIG. 6 presents a flowchart of the processing executed at the in-car device 1 and at the portable terminal 2 in the second embodiment of the present invention described above in order to impose operational restrictions on a given application while the vehicle is in a traveling state.

In steps 60 through 64 in FIG. 6, processing, the details of which are identical to the processing details in steps 40 through 44 in FIG. 4 respectively, is executed by the application manager or the application.

Once a decision is made in step 64 as to the identity of the specific application being executed in the foreground through a method such as that described in reference to the first embodiment, the application manager references the terminal security policy corresponding to the identified application in the following step 65. Then, in step 66, it makes a decision with regard to the group to which the application belongs based upon the content of the terminal security policy having been referenced.

Once the group to which the application currently being executed in the foreground belongs is identified through the decision-making executed in step 66, the application manager transmits group information indicating the decision-making results to the in-car device 1 in step 67. This group information is received by the control application being executed in the control unit 10 at the in-car device 1.

In step 68, the control application determines the group to which the application being executed at the portable terminal 2 belongs based upon the group information received in step 67 and references the part of in-car device security policy corresponding to the particular group. Then, in the following step 69, it determines the details of the operational restrictions to be imposed in correspondence to the group while the vehicle is in a traveling state based upon the content of the in-car device security policy having been referenced. Then, if the vehicle is in a traveling state, the display restriction and/or the operation restriction is imposed in the following step 70 in correspondence to the details of the operational restrictions having been determined in step 69. It is to be noted that the processing in step 70 does not need to be executed if the vehicle is not in a traveling state.

It is to be noted that the processing in steps 64 through 70 in the flowchart presented in FIG. 6, in reference to which an explanation has been provided above, is repeatedly executed over predetermined processing cycles, as long as any application is being executed at the portable terminal 2. As a result, the operational restrictions imposed on the application being executed at the portable terminal 2 remain in place as long as the vehicle is in a traveling state.

The following advantage (5) is achieved through the second embodiment of the present invention described above, in addition to the various advantages (2) through (4) of the first embodiment described earlier.

(5) The portable terminal 2 in the in-car information system holds a plurality of applications and a terminal security policy with regulatory information, indicating a specific group to which each application belongs recorded therein, both stored in its memory unit 24. The control unit 20 executes an application among the plurality of applications stored in the memory unit 24 in the foreground and outputs the image corresponding to the application to the in-car device 1 via the video/audio signal output unit 26. In addition, at the in-car device 1, an in-car device security policy with regulatory information indicating the details of the operational restrictions to be imposed in correspondence to each group while the vehicle is traveling recorded therein is stored in the memory unit 14. A user operation is input via the operation unit 12 and the operation information corresponding to the user operation is then transmitted to the portable terminal 2 via the short-range wireless communication interface unit 15. At this time, application operational restrictions are imposed in the in-car information system when the vehicle is in a traveling state. In more specific terms, the portable terminal 2 identifies the application being executed in the foreground by the control unit 20 (step 64), and references the terminal security policy stored in the memory unit 24 (step 65), in order to transmit the group information corresponding to the group to which the particular application belongs, to the in-car device 1 (step 67). The in-car device 1, in turn, references the in-car device security policy stored in the memory unit 14 based upon the group information transmitted from the portable terminal 2 (step 68) so as to ascertain the details of the operational restrictions to be imposed in correspondence to the group to which the application belongs while the vehicle is traveling (step 69). It then either allows or disallows image display at the display unit 11 and transmission of the operation information via the short-range wireless communication interface unit 15 (step 70). Through these measures driving safety is assured while the vehicle remains in a traveling state, even if the portable terminal 2 is connected to the in-car device 1 and an application installed in the portable terminal 2 is executed at the portable terminal 2 so as to output the corresponding image or sound to the in-car device 1.

It is to be noted that various types of vehicle information other than the vehicle speed information, which are output from the vehicle, may also be obtained by the in-car device in the embodiments described above. Such vehicle information taken into the in-car device 1 may be utilized in processing executed in the in-car device 1 or it may be output from the in-car device 1 to the portable terminal 2 and used in processing executed at the portable terminal 2. For instance, a start-up condition indicated by such vehicle information may be set in advance in correspondence to each application and when vehicle information indicating a specific start-up condition is output from the vehicle, the corresponding application may be started up automatically at the portable terminal 2. Information indicating the start-up conditions for the individual applications may be transmitted from the portable terminal 2 to the in-car device 1 and a decision as to whether or not a start-up condition exists may be made in the in-car device 1 based upon the vehicle information. As an alternative, the vehicle information may be transmitted from the in-car device 1 to the portable terminal 2 and the decision as to whether or not a start-up condition exists may be made at the portable terminal 2 based upon the vehicle information. Such use of vehicle information makes it possible to automatically start up an application at the portable terminal 2, which, for instance, enables a search for gas stations located near the current position when vehicle information indicating that the quantity of remaining fuel in the vehicle has become less than a predetermined quantity, is output from the vehicle.

In the embodiments described above, transmission of video signals and audio signals from the portable terminal 2 to the in-car device 1 is enabled by connecting the in-car device 1 and the portable terminal 2 with each other via the video/audio cable 3. In addition, the in-car device 1 and the portable terminal 2 communicate with each other through short-range wireless communication carried out in compliance with a predetermined communication standard such as Bluetooth in the embodiments described above. However, the present invention is not limited to these examples and may be adopted in conjunction with another communication method or another signal transmission method. For instance, video signals and audio signals originating from the portable terminal 2 may be transmitted to the in-car device 1 through wireless communication. In addition, communication between the in-car device 1 and the portable terminal 2 may be carried out through wired communication such as USB communication. In other words, the present invention may be adopted in conjunction with any communication method as long as it allows the in-car device 1 and the portable terminal 2 to exchange necessary signals and information.

In the embodiments described above, button information indicating the details of a button operation performed by the user or coordinate information indicating the position on the screen specified through a touch panel operation is transmitted as operation information from the in-car device 1 to the portable terminal 2 and the portable terminal 2 then determines the details of the user operation based upon the operation information. However, the present invention is not limited to this example and the in-car device 1 may instead determines the details of the user operation and then the in-car device 1 may transmit an application start-up command or an application end command to the portable terminal 2 based upon the user operation details thus determined.

Figure 7:
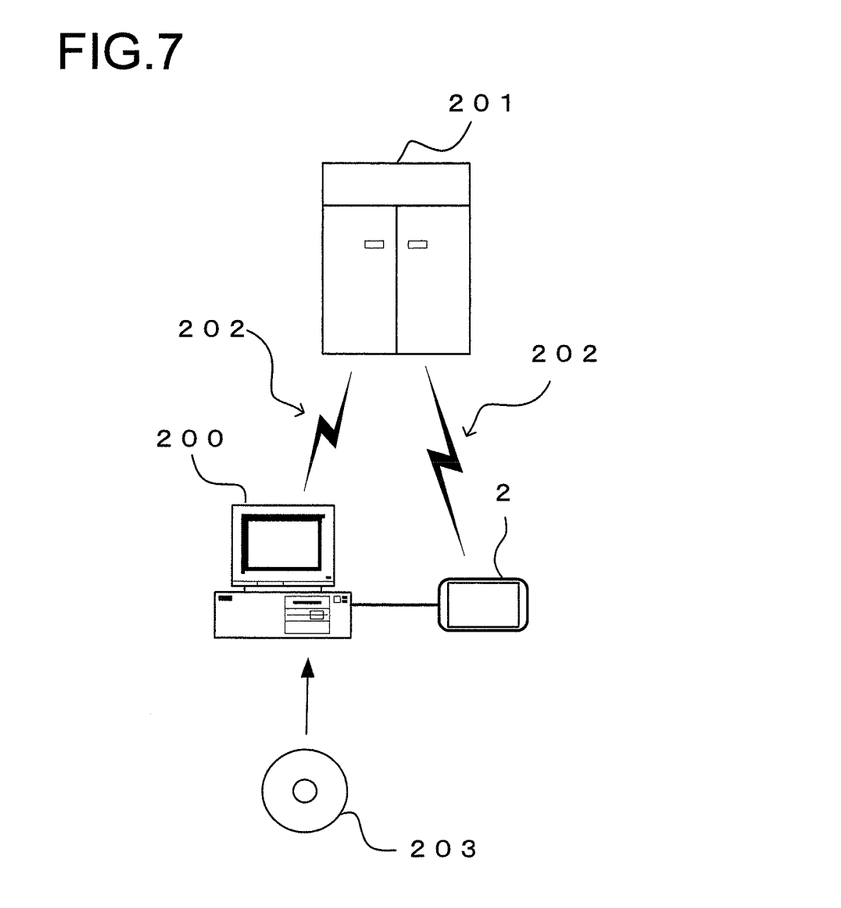
FIG. 7 shows how a program may be provided to a portable terminal.

It is to be noted that a program that realizes the functions of the application manager achieved in either of the embodiments described above may be provided to the portable terminal 2 in a recording medium such as a CD-ROM or through an electric communication line such as the Internet. FIG. 7 shows how such a program may be provided. A personal computer 200, which is connected with the portable terminal 2, provides the application manager program made available from a server apparatus 201 via a communication line 202 or read out from a CD-ROM 203 to the portable terminal 2. In addition, the application manager program available at the server apparatus 201 may be directly provided to the portable terminal 2 through the communication line 202 by bypassing the personal computer 200. The communication line 202 may be the Internet, a communication network for personal computer communication or the like, a dedicated communication line, a portable telephone network or the like. The server 201 transmits the application manager program to the personal computer 200 or the portable terminal 2 via the communication line 202. Namely, the program converted to a data signal on a carrier wave is transmitted via the communication line 202. In other words, the application manager program, which can be executed at the portable terminal 2, may be provided as a computer-readable program product assuming any of various modes including a recording medium and a carrier wave.

The various embodiments and variations thereof described above simply represent examples and as long as features characterizing the present invention remain intact, the present invention is in no way limited to the particulars of these embodiments and variations. In addition, the embodiments and the variations thereof may be adopted in any combination.

What is claimed is:

1. An in-car information system including a portable information terminal and an in-car device, wherein:
    the information terminal comprises a storage unit in which a plurality of applications and first regulatory information indicating a group to which each application belongs are stored, a control unit that executes an application, among the plurality of applications stored in the storage unit, in a foreground, and an image output unit that outputs an image corresponding to the application being executed in the foreground by the control unit to the in-car device;
    the in-car device comprises a display unit that displays the image output from the information terminal, an operation input unit via which an operation performed by a user is input, an operation information transmission unit that transmits operation information corresponding to the operation input via the operation input unit to the information terminal, and an in-car storage unit in which second regulatory information pertaining to operational restrictions to be imposed in correspondence to each group while a vehicle is in a traveling state is stored;
    the information terminal transmits group information corresponding to the group to which the application belongs to the in-car device, by identifying the application being executed in the foreground by the control unit and referencing the first regulatory information; and
    the in-car device determines details of the operational restrictions to be imposed in correspondence to the group to which the application belongs while the vehicle is in a traveling state by referencing the second regulatory information based upon the group information transmitted from the information terminal and either allows or disallows the display of the image at the display unit and transmission of the operation information via the operation information transmission unit.

2. An in-car information system according to claim 1, wherein:
    the plurality of applications includes an application manager used to establish a connection between the information terminal and the in-car device; and
    the control unit executes the application other than the application manager in the foreground and executes the application manager in a background.

3. An in-car information system according to claim 2, wherein:
    if the application other than the application manager is started up while the application manager is being executed in the foreground, the control unit moves the application manager to the background and executes the application in the foreground.

4. An in-car information system according to claim 3, wherein:
    the application manager, currently being executed in the foreground by the control unit, starts up another application of the plurality of applications other than the application manager selected by the user; and
    the application manager, currently being executed in the background by the control unit, identifies the another application having been started up as the another application being executed in the foreground.

5. An in-car information system according to claim 2, wherein:
    the information terminal includes an operating system engaged in control of operations by the control unit; and
    the application manager issues a request to the operating system for information to be used to identify the application being executed in the foreground over predetermined cycles.

6. An application execution method adopted in an in-car information system including a portable information terminal and an in-car device, comprising:
    storing a plurality of applications and first regulatory information indicating a group to which each application belongs in advance in the information terminal;
    storing second regulatory information pertaining to operational restrictions to be imposed in correspondence to each group while a vehicle is in a traveling state in advance in the in-car device,
    transmitting, when an application among the plurality of applications is being executed in a foreground, group information corresponding to the group to which the application belongs to the in-car device, by identifying the application being executed in the foreground and referencing the first regulatory information at the information terminal; and
    determining details of the operational restrictions to be imposed in correspondence to the group to which the application belongs, while the vehicle is in a traveling state by referencing the second regulatory information based upon the group information transmitted from the information terminal, and either allowing or disallowing display of an image output from the information terminal and transmission of operation information, which corresponds to a user operation, to the information terminal, at the in-car device.

* * * * *